United States Patent
Castillo (10) Patent No.: US 10,557,328 B2
(45) Date of Patent: Feb. 11, 2020

(54) THERMAL LOAD BASED AUTOMATIC VALVE ARRANGEMENT AND METHOD

(71) Applicant: Jose Rafael Gonzalez Castillo, Fulshear, TX (US)

(72) Inventor: Jose Rafael Gonzalez Castillo, Fulshear, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 232 days.

(21) Appl. No.: 15/347,680

(22) Filed: Nov. 9, 2016

(65) Prior Publication Data
US 2018/0128078 A1    May 10, 2018

(51) Int. Cl.
| | | |
|---|---|---|
| *E21B 34/06* | (2006.01) | |
| *E21B 43/24* | (2006.01) | |
| *E21B 47/06* | (2012.01) | |
| *F16K 1/34* | (2006.01) | |
| *F16K 15/18* | (2006.01) | |
| *F16K 31/00* | (2006.01) | |
| *G05D 23/185* | (2006.01) | |

(52) U.S. Cl.
CPC .......... *E21B 34/06* (2013.01); *E21B 43/2406* (2013.01); *E21B 47/065* (2013.01); *F16K 1/34* (2013.01); *F16K 15/18* (2013.01); *F16K 31/002* (2013.01); *G05D 23/1852* (2013.01)

(58) Field of Classification Search
CPC .... E21B 34/06; E21B 34/2406; F16K 31/002; G05D 23/1852
See application file for complete search history.

(56) References Cited

U.S. PATENT DOCUMENTS

| | | | |
|---|---|---|---|
| 2,880,959 A | 4/1959 | Falconer | |
| 3,319,717 A | 5/1967 | Chenoweth | |
| 5,878,949 A * | 3/1999 | Matsui | G05D 23/025 |
| | | | 137/509 |
| 5,879,949 A * | 3/1999 | Cole | H01J 49/167 |
| | | | 250/288 |
| 5,996,687 A | 12/1999 | Pringle et al. | |
| 8,820,413 B2 | 9/2014 | Mathiesen et al. | |
| 2005/0139688 A1* | 6/2005 | Yang | F16K 31/002 |
| | | | 236/12.11 |

(Continued)

OTHER PUBLICATIONS

Canadian Office Action; CA application: 2,984,549; dated Jan. 10, 2019: 5 pages.

*Primary Examiner* — Ljiljana V. Ciric
*Assistant Examiner* — Alexis K Cox
(74) *Attorney, Agent, or Firm* — Cantor Colburn LLP (57) ABSTRACT

A thermal load based automatic valve arrangement including an actuator responsive to fluid temperature flowing through the arrangement, a closure member operably connected to the actuator, and a seat receptive to the closure member to prevent or restrict fluid flow through the arrangement in a first direction when actuated while still allowing fluid flow in a second direction. A method for controlling steam movement in a production string of a SAGD (Steam Assisted Gravity Drainage) installation including sensing with an actuator, temperature of fluid moving through a valve arrangement, automatically adjusting the valve arrangement pursuant to thermal load on the actuator.

16 Claims, 8 Drawing Sheets

(56) References Cited

U.S. PATENT DOCUMENTS

| | | | |
|---|---|---|---|
| 2009/0194718 A1* | 8/2009 | Kulesha | F16K 31/002 251/74 |
| 2013/0160972 A1 | 6/2013 | Sheppard et al. | |
| 2013/0298613 A1* | 11/2013 | Juckel | D06F 39/024 68/17 R |
| 2014/0262200 A1* | 9/2014 | Sheppard | G05D 23/1852 165/297 |
| 2015/0355648 A1* | 12/2015 | Tempel | E03C 1/041 236/101 R |

* cited by examiner

THERMAL LOAD BASED AUTOMATIC VALVE ARRANGEMENT AND METHOD

BACKGROUND

Resource recovery requires valves in various formats. These are needed to prevent fluid flow in a direction or allow fluid flow in a direction. More advanced valve systems include controllers that can adjust the valves for variable flow rates therethrough or to close off fluid flow therethrough entirely. Some such systems have been substantially automatic and some of those work admirably. Nevertheless, in view of the myriad possible situations and configurations in a downhole environment, the art is always receptive to new and different arrangements that can improve efficiency, reduce cost or enhance production.

SUMMARY

A thermal load based automatic valve arrangement including an actuator responsive to fluid temperature flowing through the arrangement, a closure member operably connected to the actuator, and a seat receptive to the closure member to prevent or restrict fluid flow through the arrangement in a first direction when actuated while still allowing fluid flow in a second direction.

A method for controlling steam movement in a production string of a SAGD installation including sensing with an actuator, temperature of fluid moving through a valve arrangement, automatically adjusting the valve arrangement pursuant to thermal load on the actuator.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
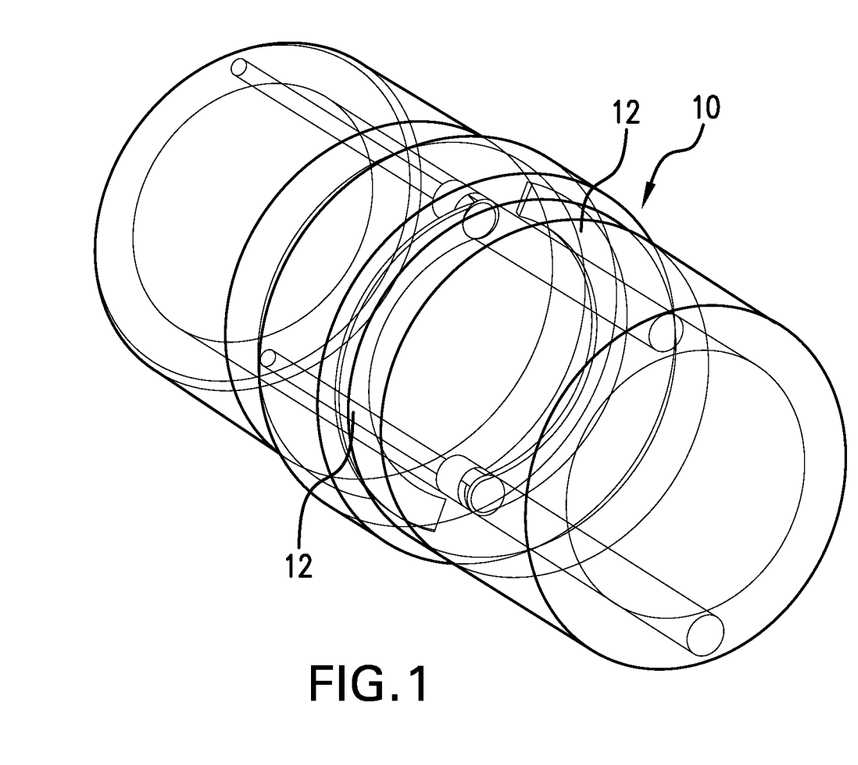
FIG. 1 is a perspective view of a first embodiment of a thermal load based automatic valve arrangement disposed in a housing.
Figure 2:
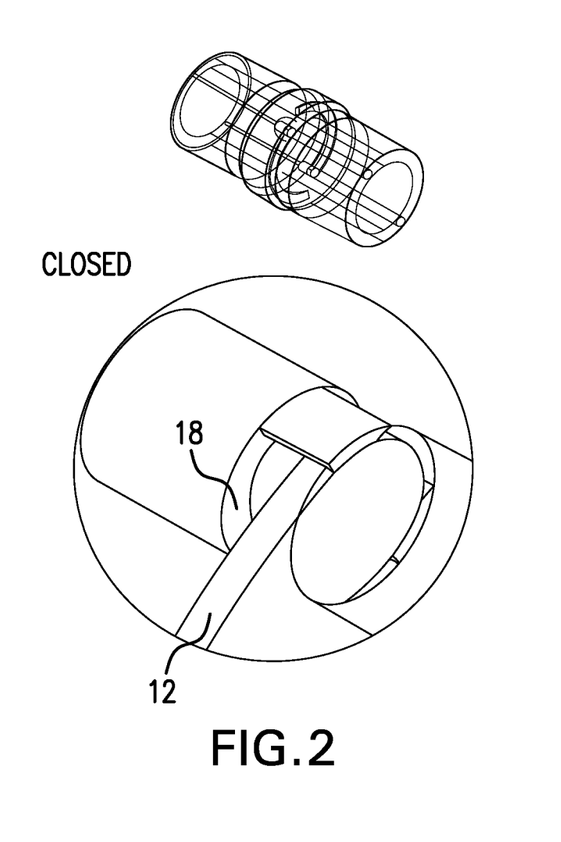
FIG. 2 is an enlarged view of a closure member portion of the embodiment of FIG. 1 in a closed position.
Figure 3:
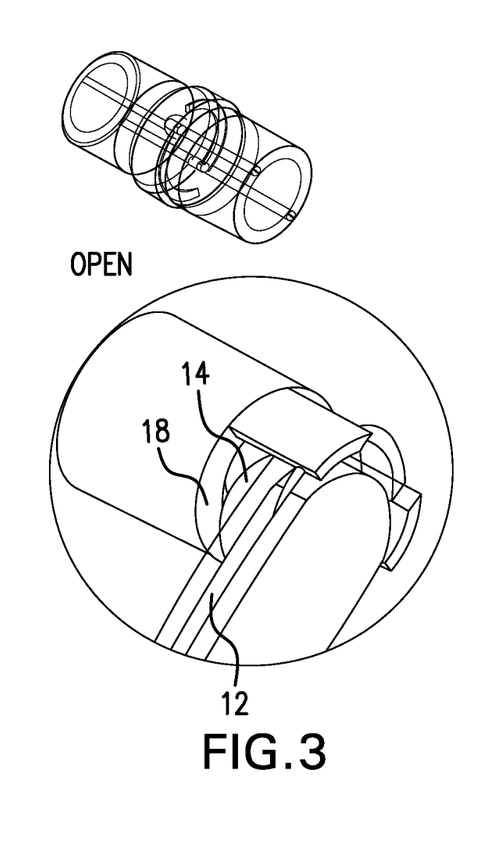
FIG. 3 is an enlarged view of a closure member portion of the embodiment of FIG. 1 in an open position.

Referring to FIG. 1, a first embodiment of a thermal load based automatic valve arrangement 10 is illustrated. The arrangement may be employed in any situation where a thermal distinction over a period of time heralds a change in a flow regime or constitution that needs to be managed. More specifically, there are instances where a change in temperature of a flow will occur only in relation to flow of an undesired fluid. Since the flow of undesired fluid equates to reduced overall efficiency in the recovery process, it is desirable to manage such flows. One such situation is in a steam assisted gravity drainage (SAGD) system. It will be appreciated that such systems employ steam in an injector well to increase motility of heavy hydrocarbons for production through a nearby production well. The configuration of such wells is known to the art and does not require further disclosure of any kind. It will be understood that if steam from the injector well breaks through to the producer well, efficiency is lost. Accordingly the arrangement 10 is configured to allow fluid flow therethrough at a temperature lower than the steam temperature and restrict (choke) or prevent flow of fluid therethrough if the temperature evidences that steam is flowing through the valve. Preventing steam through the valve both reduces produced steam and causes the steam to flow to other areas of the formation thereby improving distribution of steam and the motility of hydrocarbons in the formation. This is all done automatically based upon the construction of the arrangement 10. For clarity, as used herein "a production direction" refers fluid flow into a production well whereas "a presoak direction" refers to a fluid flow out of the production well. Each embodiment is described individually.

Referring to FIGS. 1-4, the arrangement 10 comprises an actuator 12 that is reactive to temperature change by elongation with increasing temperature and retraction in response to lower temperature. The actuator is operably connected to a closure member 14 that is shaped and dimensioned (e.g. a hemisphere) to be capable of seating on a seat 16 at a mouth 18 of a flow port 20. The actuator 12 comprises a material that is temperature sensitive such that when exposed to a higher than "normal" temperature for the actuator 12, it will elongate as it is formed of a thermally expandable material. It will be appreciated that the ultimate length change of the actuator 12 will be related to the length of the material itself as it will elongate a little for each discreet portion thereof. Overall, over the body (arcuate in some embodiments, straight in others, helical in yet others) of actuator 12, sufficient length change is achievable to cycle the closure member 14 between seated on the seat 16 and unseated to allow flow. Suitable materials include but are not limited to: Stainless Steel, austenite nickel chromium based superalloys, other nickel based alloys (with alloying ingredients such as aluminum, carbon, chromium, cobalt, copper, iron, manganese, molybdenum, titanium, tungsten, zirconium), copper and others. With respect to "normal" temperature, it will be understood that depending upon in what ambient conditions the arrangement will be used such as what well, depth, proximity to steam source, etc. the "normal" temperature will be different. Accordingly, the term "normal" as used herein is intended to convey that if the temperature is "normal", the valve will be open and capable of closing should the temperature increase sufficiently (due to steam influence, etc.). For temperatures above normal, then, the closure member 14, pursuant to a thermal input on the actuator 12, will be moved to a seated position on the seat 16 and prevent fluid flow therepast in a production direction.

It is to be understood that when constructing the arrangement 10, one must consider the expected normal downhole temperature to ensure that flow through the arrangement 10 will continue in the production direction at downhole temperatures as opposed to surface temperatures. Were this not accounted for, the arrangement would close simply due to the difference between surface temperatures (at manufacture) and normal unmodified downhole temperatures. Clearly this would be counterproductive. Accordingly, during manufacture, the dimensions of actuator 12 or the positioning of actuator 12 will be adjusted to ensure that when in service in the target downhole environment, the actuator 12 will support the arrangement 10 in the open position and yet when exposed to steam, will continue to adjust its dimensions to urge the arrangement 10 to a choked or closed condition depending upon the thermal load applied thereto. The thermal load applied is proportional to the volume of steam flowing through the arrangement 10. When the arrangement 10 is choked or closed, the pressure drop thereacross is increased or flow is entirely prevented therethrough and the steam will naturally be distributed toward more favorable (lower resistance) areas of the formation. When temperature at the arrangement 10 returns to an acceptable level indicating that steam will not flow therethrough at unacceptable rates, the arrangement 10 will automatically allow greater volume therethrough due to the actuator 12 retracting to a position associated with a lower temperature. This process of infinitely opening, choking and closing the arrangement 10 will continue for the service life of the arrangement responsive to changing temperature conditions of the fluid flowing through the arrangement 10.

It will be appreciated by those of skill in the art that prior to beginning steam injection through the injection well, there is a presoak period during which steam is pumped into the formation through the production well. This results in steam flowing essentially backwards through the arrangements disclosure herein. Since the arrangement doesn't care which direction fluid is flowing, the arrangement will still heat up and close pursuant to thermal load of the steam and the design characteristics of the arrangement discussed above. Preventing the presoak condition is contrary to operator desires so the arrangements disclosed herein, In addition to choking or shutting off flow in a first direction (i.e. a production direction), when confronted with higher thermal loading, the embodiments hereof are also configured to still allow flow in a second direction (e.g. a presoak direction . . . opposite the production direction) despite the higher temperature. Specifically, the arrangement 10 is configured to still allow fluid flow past the arrangement in the presoak direction even when the actuator 12 urges the closure member 14 onto the seat 16 pursuant to thermal load. This is accomplished by increasing pressure in the presoak fluid to force the closure member 14 off its seat 16. For the embodiment of FIGS. 1-4, the force driving the closure member 14 off its seat is roughly perpendicular to the actuating force of the actuator 12 such that driving the closure member 14 off the seat 16 requires only deflecting the actuator 12 laterally over its length rather than fighting the actuation force of actuator 12. This is also the case for the embodiment of FIGS. 5-7. In other embodiments including those of FIGS. 8-13, presoak flow is still preserved but the presoak pressure must directly overcome the actuation force of the relevant actuators.

Figure 4:
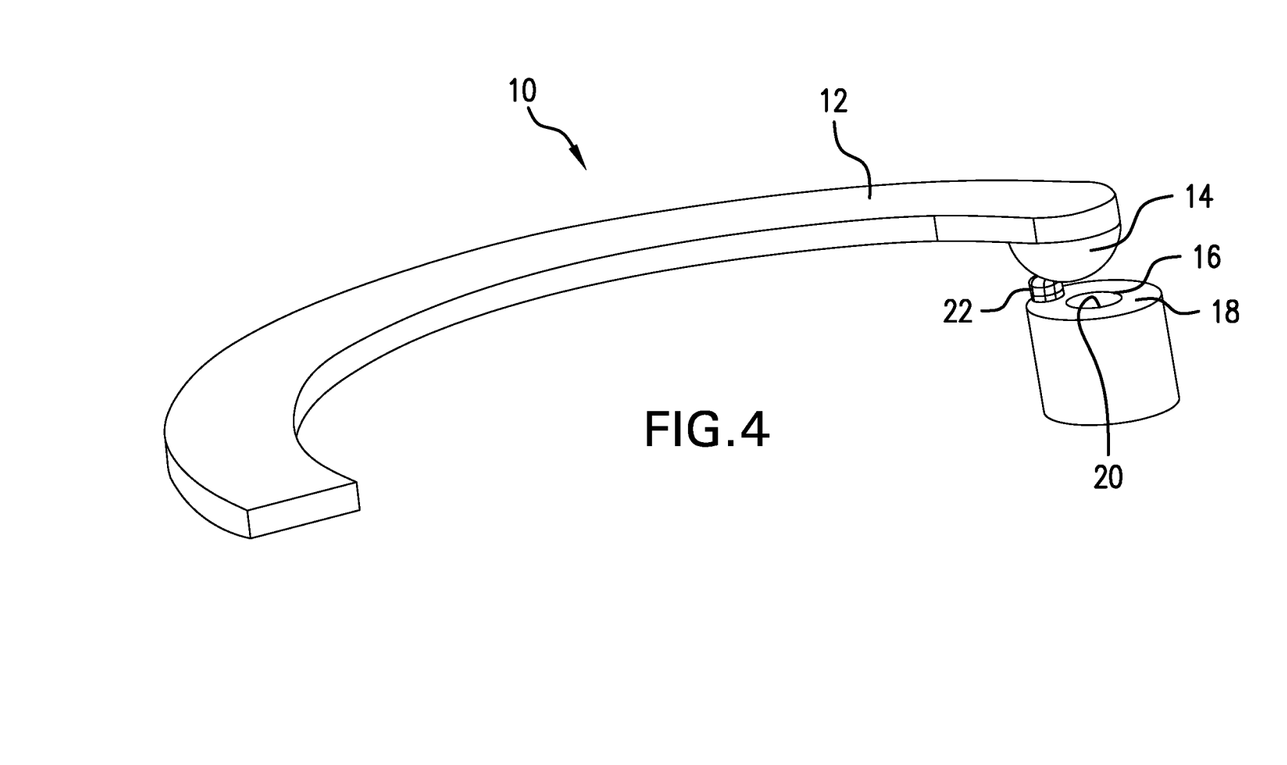
FIG. 4 is a perspective view of the arrangement of FIG. 1, removed from surrounding structure for visual clarity and illustrating lift configuration used in some embodiments.

Some iterations of the embodiment of FIG. 1, visible only in FIG. 4, will also include a lift configuration 22. The lift configuration 22 possesses a geometry dictated by the minimum required open flow area for the desired flow rate that will ensure that the closure member 14 will move away from seat 16 sufficiently to ensure that the total flow area around the closure member 14 is at least as large as the flow area through the port 20. This ensures that the arrangement does not behave as a choke during conditions where choking or closure is not intended.

Figure 5:
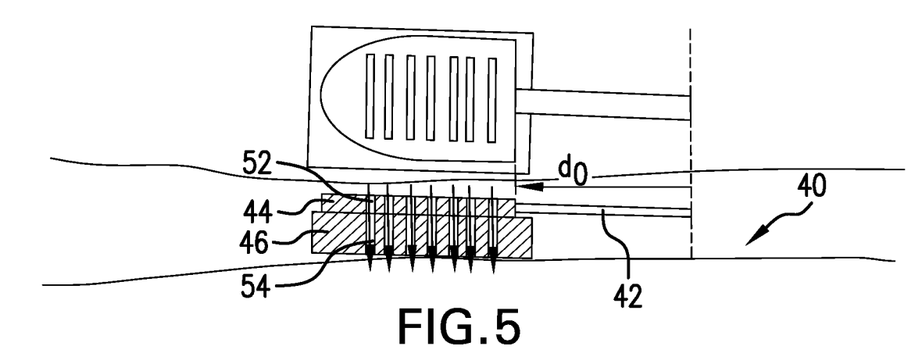
FIG. 5 is a schematic cross sectional view of a second embodiment of a thermal load based automatic valve arrangement in a flow position.
Figure 6:
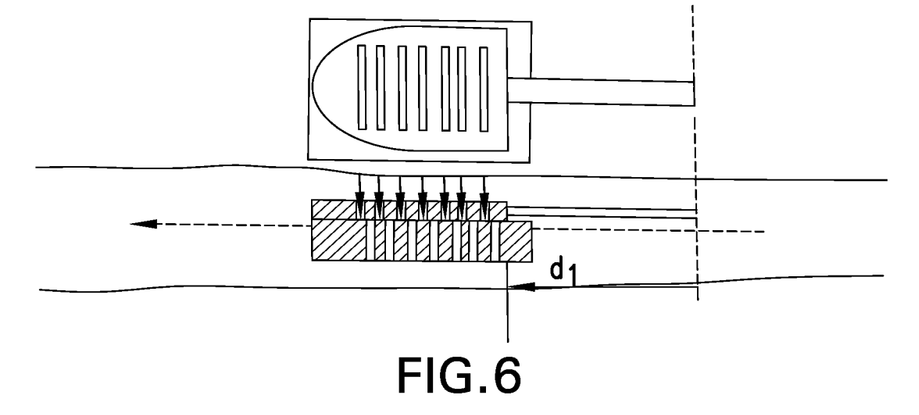
FIG. 6 is a schematic cross sectional view of the second embodiment of a thermal load based automatic valve arrangement in a closed position.
Figure 7:
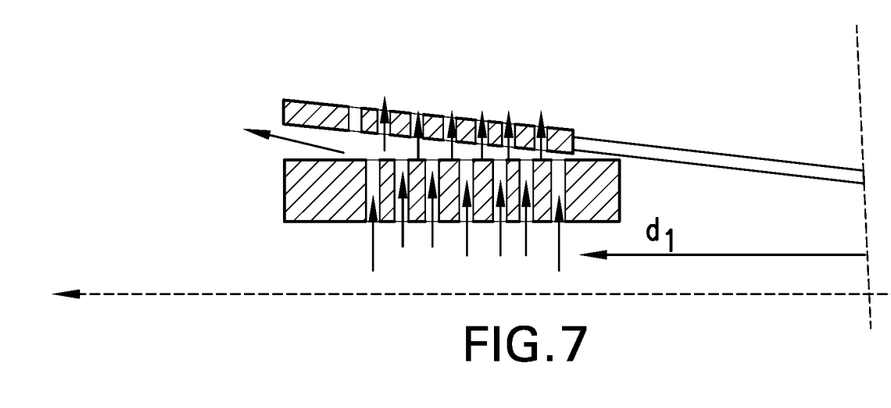
FIG. 7 is a view of the embodiment of FIG. 5 in a closed position but illustrating the capability of flow in a presoak direction.

Referring to FIGS. 5-7, a second embodiment of a thermal load based automatic valve arrangement identified as 40 is illustrated. This embodiment employs a bar actuator 42 that grows in length responsive to a thermal load similar to the foregoing embodiment but is connected to a closure member 44, that is plate-like in form which is configured to correspond with a seat 46 at the mouth 48 of a port 50. Closure member 44 comprises a material having one of more orifices 52 therethrough. The seat 46 comprises a similarly shaped material having its own orifices 54 therethrough. Orifices 52 are alignable and misalignable with orifices 54 by relative movement of the closure member 44 with respect to the seat 46 which occurs pursuant to a thermally induced change in length of the actuator 42. Depending upon the degree of alignment of the orifices 52 and 54, the arrangement can be opened, choked or closed. It is to be appreciated that when selecting dimensions and number of orifices to be presented by the closure member 44 and the seat 46, a flow area through the port 50 should be taken into account and the total flow areas of the orifices be at least equal to if not greater than the flow area of the port 50. Again, this ensures that the arrangement does not behave as a choke during thermal conditions where choking or closure is not intended.

In the embodiment of FIGS. 5-7, and particularly illustrated in FIG. 7, flow in the presoak direction is ensured similarly to that of the embodiment of FIGS. 1-4. More specifically, where the orifices 52 are thermally positioned out of alignment with orifices 54, the closure member 44 may be unseated from seat 46 through deflection of the actuator 42.

Figure 8:
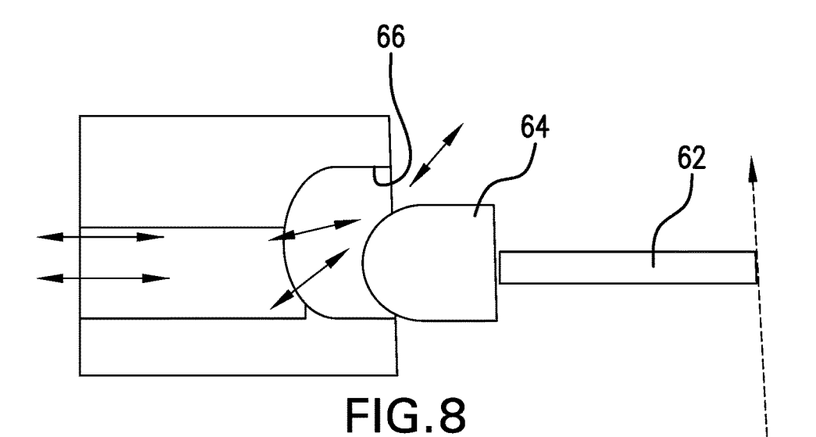
FIG. 8 is a schematic cross sectional view of a third embodiment similar to the second embodiment but having a different closure member and operation, illustrated in a flow position.
Figure 9:
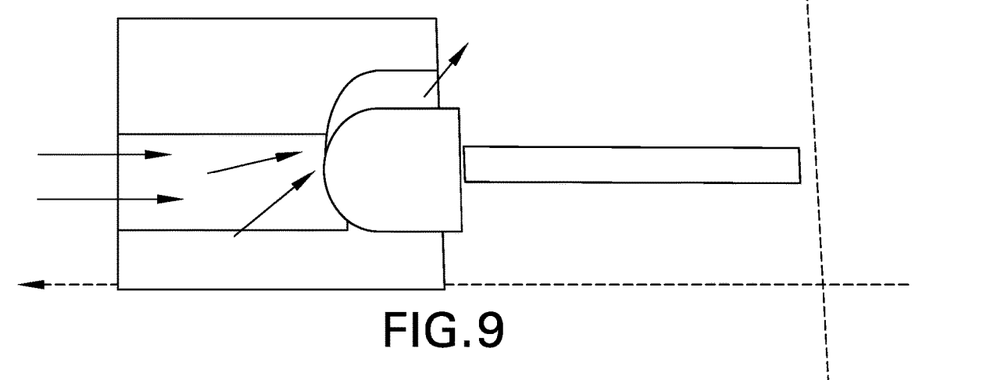
FIG. 9 is the embodiment of FIG. 8 in a closed position.
Figure 10:
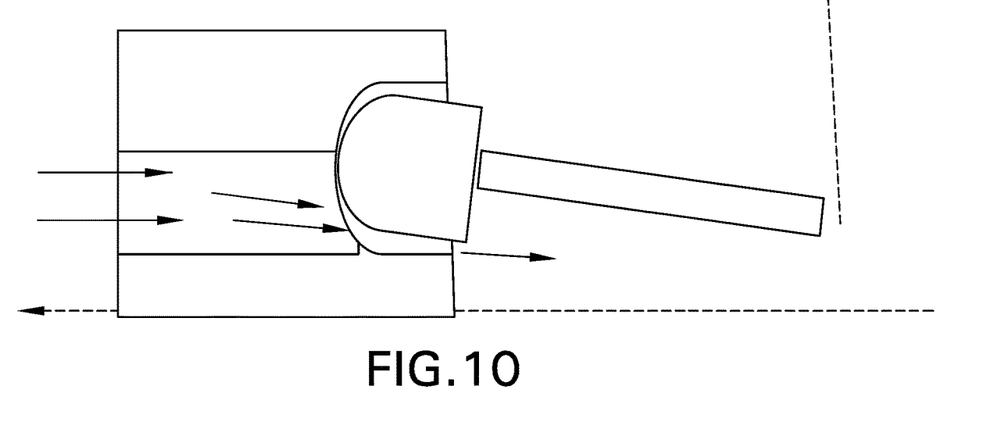
FIG. 10 is the embodiment of FIG. 8 in a presoak flow position when the valve is heated.

Referring to FIGS. 8-10, another embodiment is illustrated. In this embodiment the actuator 62 actuates a closure member 64 relative to a seat 66 pursuant to thermal load on the actuator 62. In this embodiment thermal increase will choke or close the valve like in the previous embodiments but the operation of this arrangement with respect to presoak is somewhat different. Upon inspection of the drawings, one will notice that seat 66 is sized to be larger than the closure member 64. This allows for the condition illustrated in FIG. 10 during a presoak flow. It will be appreciated that the actuator 62 is laterally deflected and slightly axially retracted by the presoak flow. Because of the configuration of the seat 66, there is a place for the closure member 64 to go and so presoak fluid may flow past the closure member 64 while production flow would not deflect the actuator 62 thereby leaving the seated closure member 64 in its seat 62 preventing flow therepast.

Figure 11:
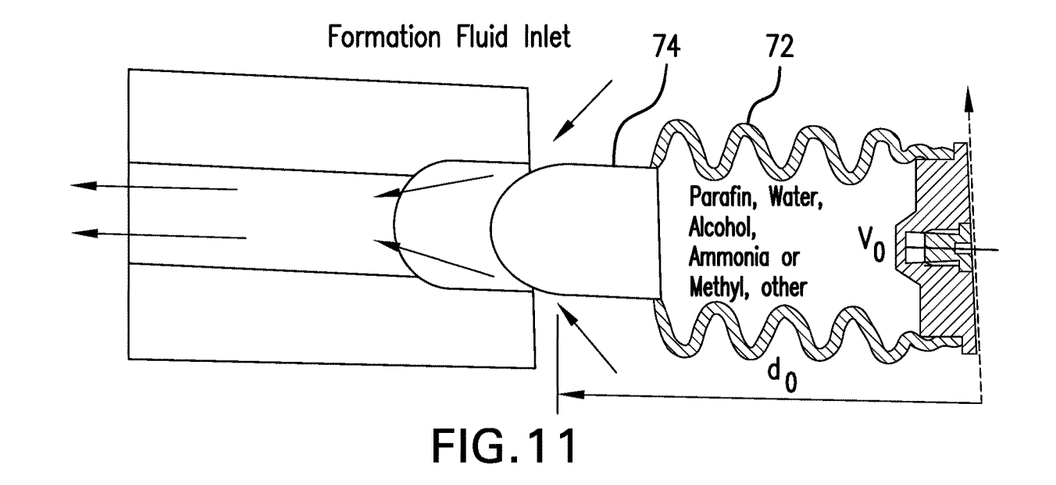
FIG. 11 is a schematic cross sectional view of a fourth embodiment having a different closure member and operation, illustrated in a flow position.
Figure 12:
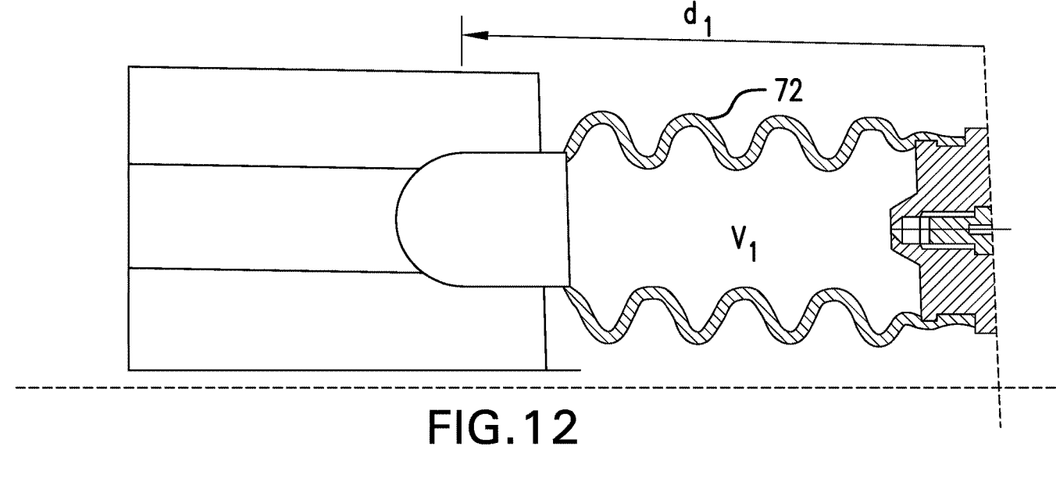
FIG. 12 is the embodiment of FIG. 11 in a closed position.
Figure 13:
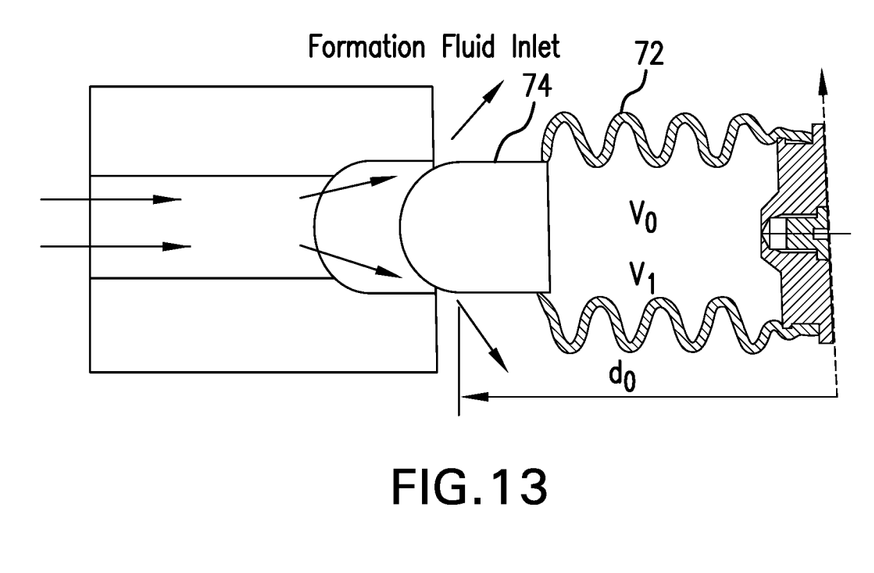
FIG. 13 is the embodiment of FIG. 11 in a closed but presoak flowing position.

Referring to FIGS. 11-13, yet another embodiment is illustrated. In this embodiment the actuator 72 is a fluid filled bellows. The fluid in the bellows expands with increasing thermal load as do the previous embodiments and hence seats a closure member 74 in a seat 76. Since the actuator 72 in this embodiment is fluid based, the seat need not have a shape different than the closure member 72 since the actuation force of the actuator 72 may be relatively easily overcome by the presoak fluid pressure to force the closure member 74 off the seat 76 for presoak flow while the same would remain reliably seated against flow in a production direction.

A method for controlling steam movement in a production string of a SAGD installation using any of the above described embodiments includes sensing with an actuator, temperature of fluid moving through a valve arrangement; and automatically adjusting the valve arrangement pursuant to thermal load on the actuator.

Set forth below are some embodiments of the foregoing disclosure:

Embodiment 1: A thermal load based automatic valve arrangement including an actuator responsive to fluid temperature flowing through the arrangement, a closure member operably connected to the actuator, and a seat receptive to the closure member to prevent or restrict fluid flow through the arrangement in a first direction when actuated while still allowing fluid flow in a second direction.

Embodiment 2: The arrangement as in any prior embodiment wherein the first direction is a production direction.

Embodiment 3: The arrangement as in any prior embodiment wherein the second direction is a presoak direction.

Embodiment 4: The arrangement as in any prior embodiment wherein the actuator is thermally expandable.

Embodiment 5: The arrangement as in any prior embodiment wherein the actuator is an arcuate member.

Embodiment 6: The arrangement as in any prior embodiment wherein the actuator is a helical member.

Embodiment 7: The arrangement as in any prior embodiment wherein the actuator is a straight member.

Embodiment 8: The arrangement as in any prior embodiment wherein the closure member is a hemisphere.

Embodiment 9: The arrangement as in any prior embodiment wherein the closure member is plate-like.

Embodiment 10: The arrangement as in any prior embodiment wherein the closure member includes an orifice.

Embodiment 11: The arrangement as in any prior embodiment wherein the orifice is alignable or misalignable with another orifice in the seat.

Embodiment 12: The arrangement as in any prior embodiment wherein the closure member is displaceable from the seat in response to flow in the second direction.

Embodiment 13: The arrangement as in any prior embodiment further comprising a lift configuration.

Embodiment 14: The arrangement as in any prior embodiment wherein the lift configuration extends from the seat.

Embodiment 15: The arrangement as in any prior embodiment wherein the lift configuration interacts with the closure member during retraction thereof to increase displacement of the closure member from the seat.

Embodiment 16: The arrangement as in any prior embodiment wherein the lift configuration contacts the closure member at a plane existing at about 45 degrees to the closure member.

Embodiment 17: A method for controlling steam movement in a production string of a SAGD installation including sensing with an actuator, temperature of fluid moving through a valve arrangement, automatically adjusting the valve arrangement pursuant to thermal load on the actuator The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A thermal load based automatic valve arrangement comprising:
   an actuator responsive to fluid temperature flowing through the arrangement;
   a closure member operably connected to the actuator; and
   a seat configured to receive the closure member when actuated such that fluid flow through the arrangement is prevented or restricted in a first direction while fluid flow through the arrangement is still allowed in a second direction.

2. The arrangement as claimed in claim 1 wherein the first direction is a production direction.

3. The arrangement as claimed in claim 1 wherein the second direction is a presoak direction.

4. The arrangement as claimed in claim 1 wherein the actuator is thermally expandable.

5. The arrangement as claimed in claim 1 wherein the actuator is an arcuate member.

6. The arrangement as claimed in claim 1 wherein the actuator is a helical member.

7. The arrangement as claimed in claim 1 wherein the actuator is a straight member.

8. The arrangement as claimed in claim 1 wherein the closure member is a hemisphere.

9. The arrangement as claimed in claim 1 wherein the closure member is plate-like.

10. The arrangement as claimed in claim 1 wherein the closure member includes an orifice.

11. The arrangement as claimed in claim 10 wherein the orifice is alignable or misalignable with another orifice in the seat.

12. The arrangement as claimed in claim 1 wherein the closure member is displaceable from the seat in response to flow in the second direction.

13. The arrangement as claimed in claim 1 further comprising a lift configuration.

14. The arrangement as claimed in claim 13 wherein the lift configuration extends from the seat.

15. The arrangement as claimed in claim 13 wherein the lift configuration interacts with the closure member during retraction thereof to increase displacement of the closure member from the seat.

16. The arrangement as claimed in claim 13 wherein the lift configuration contacts the closure member at a plane existing at about 45 degrees to the closure member.

* * * * *